United States Patent [19]

Conibear

[11] 4,129,958
[45] Dec. 19, 1978

[54] OMNI-DIRECTIONAL TRIGGER MECHANISM FOR ANIMAL TRAPS

[75] Inventor: Frank R. Conibear, Victoria, Canada
[73] Assignee: Woodstream Corporation, Lititz, Pa.
[21] Appl. No.: 823,862
[22] Filed: Aug. 11, 1977
[51] Int. Cl.² .............................................. A01M 23/24
[52] U.S. Cl. ............................................................ 43/92
[58] Field of Search .......................... 43/88, 90, 92–95, 43/96, 97

[56] References Cited

U.S. PATENT DOCUMENTS

| | | | |
|---|---|---|---|
| 3,411,234 | 11/1968 | Harrison | 43/97 |
| 3,421,251 | 1/1969 | Hofmeister | 43/92 |
| 3,426,471 | 2/1969 | Lehn | 43/92 |
| 3,991,509 | 12/1976 | Frost | 43/90 |
| 4,037,350 | 7/1977 | Souza | 43/96 |

*Primary Examiner*—James L. Jones, Jr.
*Attorney, Agent, or Firm*—Holman & Stern

[57] ABSTRACT

An improved trigger mechanism of the push-pull type which is particularly useful for a rotating frame animal trap, the present trigger mechanism causing the trap to be sprung on contact therewith by the animal regardless of the direction from which such contact occurs. The present trigger mechanism is slidably mounted on a frame member of the trap, the free ends of spaced prongs extending from the frame member toward the interior of the trap. A body member of the trigger mechanism mounts the spaced prongs, the anterior ends of the spaced prongs extending into overlapping engagement with the frame member and being movable relative thereto. The body member has an arcuate recess on an upper surface portion thereof, the recess loosely receiving at least a portion of the frame member therein.

10 Claims, 3 Drawing Figures

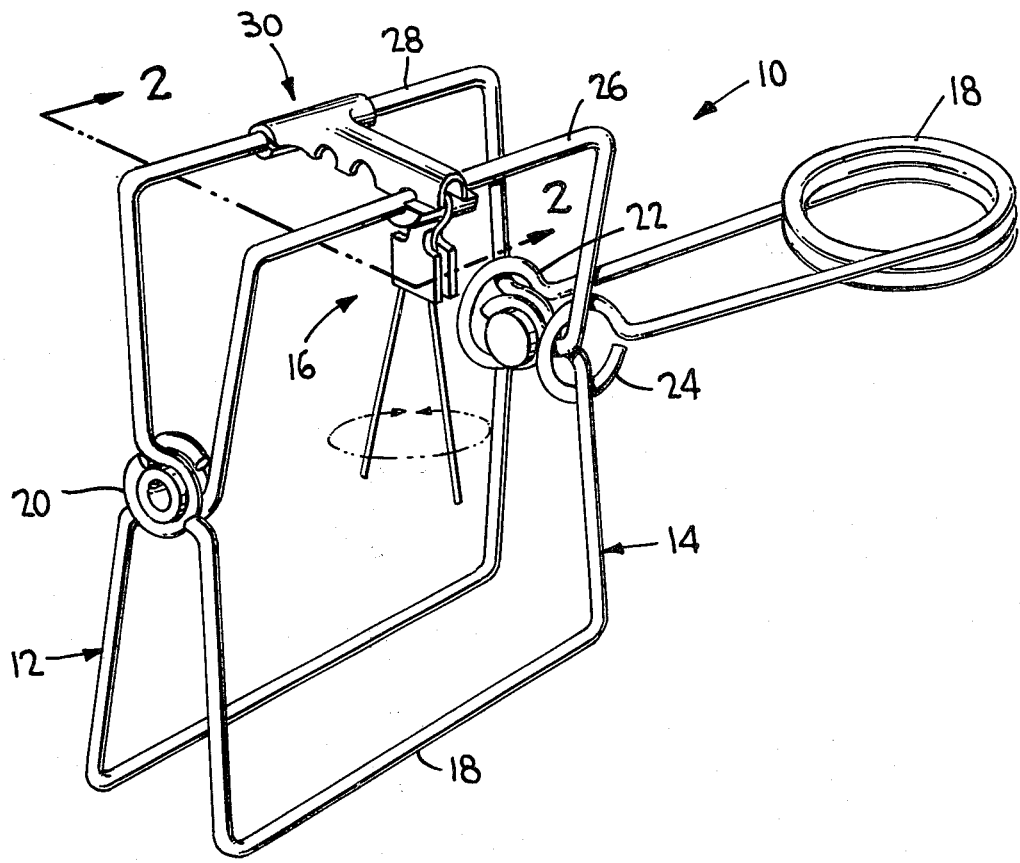
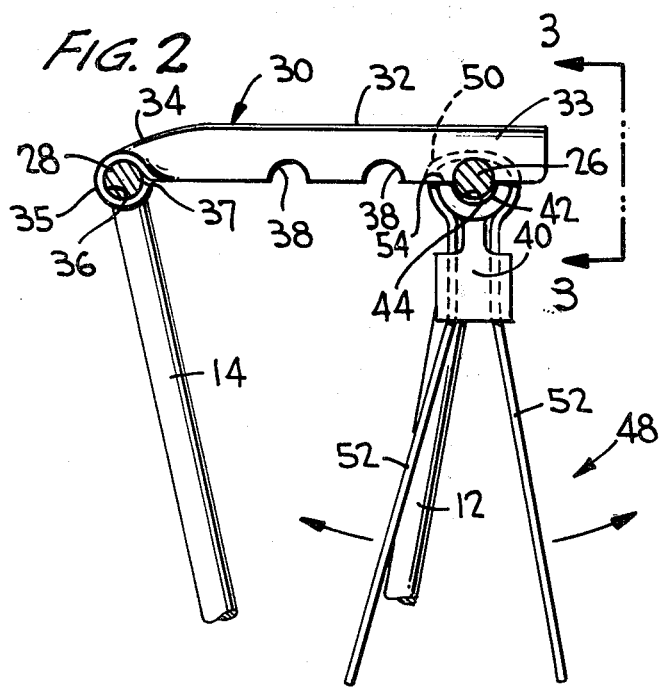

OMNI-DIRECTIONAL TRIGGER MECHANISM FOR ANIMAL TRAPS

BACKGROUND OF THE INVENTION

1. Field Of The Invention

The invention relates to animal traps, particularly rotating frame traps, and provides an improved trigger mechanism for such traps, the present trigger mechanism being similar to prior push-pull activated trigger apparatus.

2. Description Of The Prior Art

Rotating frame traps have long been used in the humane trapping of fur bearing and other animals. Such traps typically comprise a pair of similar frames, which frames can be of a generally square, rectangular, or part-trapezoidal shape, pivotally connected at adjacent ends for relative rotation on a common axis so as to form by the sides thereof two pairs of co-acting jaws. At least one actuator, consisting of a coil spring having arms terminating in closed rings slidable along and encircling one set of adjacent ends of the frames, is used to urge the jaws toward and, when the trap is sprung, maintains said jaws in a closed position. In U.S. Pat. No. 3,010,245, date of issue, Nov. 28, 1961, such a rotating frame trap is described in which the ends which cooperate with the rings are shaped so that in the set position of the trap, these ends lie substantially parallel to each other, the central portions of said ends near the common axis of the frames forming a cross within the rings on the arms of the coil spring. The disclosure of this patent is incorporated hereinto by reference. Trigger apparatus useful with rotating frame traps such as above-disclosed, have been described in the above-mentioned patent or in Lehn, U.S. Pat. No. 2,947,107 issued Aug. 2, 1960. Such trigger means maintain the frames of the trap in an open position when the trap is set, the frames being released when the trap is sprung in order to permit, as a result of the action of the spring and rings on the end of the actuator, rapid rotation of the frames through an angle of approximately 90°, the jaws of the trap thus quickly striking and killing an animal in the trap. Commonly used trigger mechanisms, such as that described in the Lehn patent referred to hereinabove, comprise a pair of prongs adapted to project inwardly toward the center of an open, set trap, which prongs are fixedly connected to a first sleeve rotatably connected to one of the sides of one of the frames of the trap. A bar rotatably mounted by a second sleeve on the adjacent side of the other frame opposite the first sleeve, has one or more notches formed therein which are adated to releasably fit over the first frame through a slot in the first sleeve, the bar thereby releasably holding the trap frames in open set positions against the bias of the actuator. When the prongs are moved forwardly or backwardly in a plane essentially perpendicular to the plane of the trap, for example by an animal passing through the open, set trap, the prongs rotate the first sleeve, the bar being thereby dislodged to permit the trap to close. However, such prior trigger mechanisms can effectively only be activated when the animal biases the prongs along a line substantially perpendicular to the plane in which the frame members lie. Thus, an animal contacting the prongs from a sidewise direction or from a direction skewed from the normal forward-backward direction does not produce the necessary force to spring the trap.

The present invention provides a trigger mechanism for rotating frame trap which is more likely to ensure that an animal will contact inwardly projecting prongs of the trigger mechanism with sufficient force to activate the mechanism, thereby springing the trap.

SUMMARY OF THE INVENTION

The present invention comprises a rotating frame trap improved by the provision of an omni-directional trigger mechanism, the present trigger mechanism activating the trap on contact with an animal entering the trap from substantially any radial direction. In the practice of the invention, the frames of the trap, which frames act as the "jaws" of the trap, are releasably held in a set position by means of a latch such as is disclosed by Lehn in U.S. Pat. No. 2,947,107, the disclosure of which patent is incorporated hereinto by reference. The latch is pivotally mounted on a side portion of one of the frames, the latch essentially comprising an elongated bar having a plurality of spaced notches formed on a lower portion thereof, the notches being adapted to receive a portion of the other of the frames in one of said notches when the trap is in a set position. The latch thus maintains the frames in a set position against the closing force exerted by the spring actuator or actuators. The improved trigger mechanism of the present invention is mounted on the frame which is received within one of the notches of the latch, the trigger mechanism being surmounted by the latch and further being angularly movable on the frame omni-directionally to dislodge the frame from the notch in the latch, thereby disengaging the latch from the frame to remove any resistance to the closing force exerted by the spring actuator. The trap is thus caused to be sprung instantly and with substantial crushing power.

The trigger mechanism comprises a body member to which a two-prong trigger arm is mated, the prongs of the trigger arm extending inwardly of the trap when in a set position. The body member has an elongated recess in an upper portion thereof, the recess being substantially semicylindrical to receive a side portion of the frame therein, the body member being surmounted by the latch. The notch in the latch receiving the frame portion therein and the recess essentially "sandwich" or enclose the cylindrical side portion of the frame, the side portion of the frame being of an arcuate dimension less then that of the recess in order that the frame is received loosely within the recess. The side portion of the frame thus has a substantial amount of play within the recess in the body member of the trigger mechanism.

Planar shoulder portions of the body member border the recess and lie adjacent to lower edge portions of the latch when the trap is in the set position. The two-prong trigger arm preferably has an upper loop portion encircling the frame to maintain the trigger mechanism loosely on the frame. When any portion of the shoulder portions of the trigger mechanism is biased against the latch with sufficient force, the latch is dislodged from the frame on which the trigger mechanism is mounted, thus springing the trap. This activating force is transmitted to the body member through one or both of the prongs extending from the trigger arm. Since the side portion of the frame is received loosely within the recess in the body member of the trigger mechanism, an activating force exerted on the prongs of the trigger arm from any direction in a plane perpendicular to the longitudinal axis of the trigger arm will bias some portion of the shoulder portion of the body member against a portion of the lower edges of the latch, thereby releasing the latch and springing the trap.

Accordingly, it is an object of the present invention to provide a trigger mechanism for a rotating frame trap which will ensure that an animal entering the trap from other than a direction perpendicular to the plane of the frames of the trap will cause the trap to be sprung.

It is a further object of the invention to provide an improved rotating frame animal trap capable of humanely trapping and killing an animal regardless of the direction from which the animal enters the trap or contacts the trigger mechanism of said trap.

Other objects and advantages of the invention will become more apparent in light of the following description of the preferred embodiments thereof.

BRIEF DESCRIPTION OF THE DRAWINGS

FIG. 1 is a perspective view of a set rotating frame trap having a trigger mechanism according to the invention;

FIG. 2 is a fragmentary sectional view taken on the line 2—2 of FIG. 1; and,

FIG. 3 is a detail elevational view of the present trigger mechanism.

DESCRIPTION OF THE PREFERRED EMBODIMENTS

Referring now to FIG. 1, a rotating frame animal trap is shown at 10 to be in the open or "set" position. The trap 10 comprises two frames 12 and 14, a trigger mechanism shown generally at 16, and a spring actuator 18. The frames 12 and 14 are pivotally mounted to each other on each end thereof by means of central pivot sections 20, a line between the sections 20 defining a pivot axis of the trap 10. The actuator 18 preferably takes the form of an expanding pressure coil spring adapted to force its ends 22 and 24 away from one another. The foregoing structure need not be described in detail since the disclosure provided in U.S. Pat. No. 3,010,245 completely describes the structure and operation of the frames 12, 14 and the actuator 18. The trap 10 can also be formed of frame members of other than the square-shape shown in FIG. 1, the part-trapezoidal frame members disclosed in U.S. Pat. No. 3,760,531 being an exemplary alternative conformation. It should be further understood that a second actuator 18 could be used about the other of the pivot sections 20 to provide additional trap closure force.

The frames 12 and 14 have side members 26 and 28 respectively which form the "jaws" of the trap 10, the longitudinal axis of the side members 26 and 28 being parallel to the pivot axis of the trap 10. The side members 26 and 28 are releasably held in the open (set) position by means of a latch 30, the latch being pivotally carried on the frame 14 as is disclosed by Lehn in U.S. Pat. No. 2,947,107. Referring also now to FIG. 2, the latch 30 comprises a U-shaped body member 32 having spaced side walls 33, the side walls 33 coming together at an inner end portion 34 which is disposed at an obtuse angle to the side walls 33. The inner end portion 34 curves about itself to form a sleeve 35 defining an opening 36, the opening 36 receiving the side member 28 of the frame 14 therein. A longitudinal slot 37 can be formed in the sleeve 35 to communicate with the opening 36 and to facilitate fitting of the latch 30 onto the side member 28. The slot 37 allows portions of the latch 30 adjacent the opening 36 to be spread apart in order to slip the side member 28 into the opening 36, the portions being pressed back together to retain said latch in place on the side member 28 of said frame 14. When assembled on the side member 28, the latch 30 is rotatable thereabout in a pivotal fashion and is also slidable longitudinaly of the side member 28. The side walls 33 of the latch 30 are provided on inner edges thereof, the inner edges being those edges facing inwardly toward the pivot axis of the trap when in a set position, with a plurality of spaced aligned notches 38. The notches 38 can be substantially semicircular in shape as shown, the depth of the notches 38 being slightly greater than the radius of the cylindrical wire from which the frames 12 and 14 are formed so that the latch 30 will not slip off the side member 26 when the trap is set. The notches 38 fit over portions of the side member 26 of the frame 12 to retain the side members 26 and 28 in a spaced relation against the closing force exerted by the actuator 18. It is to be understood that the notches 38 can be formed in shapes other than that shown and with varying depths to provide differing forces to spring the trap.

The trigger mechanism 16 is comprised of a body member 40 and a trigger arm 42. The body member 40 has a semicylindrical trough 42, the longitudinal axis of the trough 42 being parallel to the longitudinal axis of the side member 26, inner walls of the trough 42 defining a semicylindrical recess 44 into which portions of the side member 46 are received. The depth of the re recess 44 is greater than the radius of the cylindrical wire from which the frames 12 and 14 are formed, the side member 26 being loosely received within the recess 44. The walls of the side member 26 are essentially spaced from the inner walls of the trough 42 which define the recess 44 when the trap 10 is in the set position. As best seen in FIG. 3, the body member 40 of the trigger mechanism 16 is centered under and surmounted by the latch 30, the side member 26 being disposed between one of the notches 38 in the latch 30 and the recess 44 and the trough 42. The body member 40 has spaced retaining walls 46 formed on opposite sides thereof, the retaining walls 46 maintaining a trigger arm 48 in place about the body member 40. The trigger arm 48 can be formed of a unitary length of wire as shown in the drawings, which wire is formed into a loop 50 at the mid-portion thereof, the loop 50 fitting over the side member 26 and extending along both exterior side walls of the trough 42 and of the body member 40 of the trigger mechanism 16, the retaining walls 46 holding the trigger arm 48 in place about said body member 40. The distal ends of the trigger arm 48 extend from the body member 40 at angles thereto to form spaced prongs 52, the prongs being similar in conformation and function to the structure described in Lehn in U.S. Pat. No. 2,947,107. The trigger arm 48 can alternatively be formed of two separate portions of wire, each wire portion forming one of the prongs 52 at the distal ends thereof and looping at the anterior ends thereof over the side member 26 to maintain the trigger mechanism 16 in place on said side member 26. In either situation, the upper body portions of the trigger arm 48 conform to the shape of the body member 40 and are held, especially when the trigger arm 48 is formed of two wire portions, by the retaining walls 46. Alternatively, the upper portions of the trigger arm 48 can be embedded within the body member 40.

The trigger mechanism 16 is rotatable on the side member 26 of the frame 12, which side member 26 is engaged by the latch 30 over that portion of said side member 26 on which the trigger mechanism 16 is disposed. Planer shoulders 54 adjacent the recess 44 on the upper surfaces of the trough 42 effectively abut the lower edges of the side walls 33 of the latch 30 when the side member 26 is both engaged in one of the notches 38 and received within the recess 44 and the trough 42. When a force of a predetermined level is exerted from any direction on one or both of the prongs 52, the trigger arm 48 and thus the body member 40 of the trigger mechanism 16 is caused to be angularly displaced about the substantially eccentric pivot formed by the loop 50 and the recess 44 which receive the side member 26 of the frame 12, this displacement about the side member 26 occuring along a line having a vector sense in a plane perpendicular to the trigger arm 48 which lies in the same direction as the direction of the force exerted on the prongs 52. The angular displacement of the trigger mechanism 16 causes a portion of the shoulders 54 to impinge against a portion of the lower edge of one or both of the side walls 33 and to displace the latch 30 slightly outwardly of the frame 12 to disengage the side member 26 from the notch 38 in which said side member has been received, thereby springing the trap 10.

Since the trigger mechanism 16 is sensitive to force exerted against the prongs 52 from any radial orientation, the trap 10 can be sprung by an animal entering the trap from essentially any direction. The force required to disengage the latch 30 can be varied by setting the side member 26 within a selected notch 38, thereby providing selectivity in the sensitivity and the speed of action of the trap 10. The present trigger mechanism 16 can be disposed on either of the frames 12 or 14 and on any portion of said frames as long as the prongs 52 are caused to extend inwardly of the trap 10. The distance of the trigger mechanism 16 from either end of the frames can be adjusted by sliding both the trigger mechanism 16 and the latch 30 along the respective side members 26 and 28, the trap 10 being setable with the latch and trigger mechanism at any position along said side members 26 and 28 or even along portions of the frames which are perpendicular to the side members. Positioning of a trigger such as the trigger mechanism 16 to provide desired results is discussed in greater detail in U.S. Pat. No. 3,010,245.

While the wire stock from which the frames 12 and 14 are formed is preferably round or cylindrical, it is to be understood that wire stock of square or other cross-section can be utilized with appropriate modification to the latch and notches 38 inter alia, the principles underlying the present invention remaining constant regardless of such modification. It is to be further understood that certain other substantial changes could be effected to the structure shown in the drawings and described herein, many of which changes can be readily inferred from the disclosure of the patent expressly referred to hereinabove and incorporated hereinto by reference and from similar prior art. Accordingly, the invention is to be limited only by the scope of the claims appended hereto.

What is claimed is:

1. In an animal trap having similar first and second frames, each frame having side members serving as jaws and end portions extending therebetween, the end portion being pivotally connected for relative rotation of the frames between set and closed positions about a common pivot axis, and at least one actuator slidably carried on the frame to effect rapid and forceful rotation of said frames about said pivot axis, an improved trigger means for releasably maintaining the trap in a set position, comprising, when the trap is in the set position:
  a latch pivotally carried on one of said frames, the latch comprising an arm member having at least one notch spaced along said arm member and adapted to receive a portion of the other frame in said notch to hold the frames in a set position; and,
  a trigger mechanism pivotally carried on the other frame, portions of the trigger mechanism engaging said latch and being angularly displaceable about said other frame in any direction to release said other frame from said notch and thereby to release said frames for relative rotation.

2. The apparatus of claim 1, wherein the trigger mechanism comprises:
  a body member having a recess formed in an upper surface thereof, the recess receiving a portion of the other frame thereinto, the recess being of a dimension such that the portion of said frame is loosely received in the said recess, portions of the body member being adapted to impinge against the latch on angular displacement of the body member about the longitudinal axis of the portion of the other frame to bias said frame from engagement with the notch in the latch;
  means for retaining the trigger mechanism on the other frame; and,
  means carried on the body member and extending into the interior of the trap for contact with an animal entering the trap from any direction, contact with said last-mentioned means causing a displacing force to be exerted on the body member.

3. The apparatus of claim 2, wherein the last-mentioned means comprise at least one prong-like member.

4. The apparatus of claim 2, wherein the last-mentioned means comprise a pair of spaced prongs.

5. The apparatus of claim 4, and further comprising means for retaining the spaced prongs on the body member.

6. The apparatus of claim 2, wherein the means for retaining the trigger mechanism on the other frame comprises a loop of wire, the loop being disposed about the other frame to be pivotally carried thereon, portions of the loop being secured to the body member, distal ends of the wire forming said loop extending from said body member into the interior of the trap.

7. The apparatus of claim 1, wherein the trigger mechanism comprises:
  a body member having a semicylindrical trough formed in an upper portion thereof, inner walls of the trough defining a substantially semicylindrial recess, the recess receiving a portion of the other frame thereinto, the recess being of a dimension such that the portion of said other frame is loosely received within said recess, shoulder portions of the trough adjacent the recess abutting lower edge portions of the latch; and,
  a trigger arm carried on the body member and having a loop portion which fits pivotally over the other frame, end portions of the trigger arm extending inwardly of the trap for contact with an animal entering the trap from any direction, contact with said end portion causing a displacing force to be exerted on the trigger arm and thereby on the body member to cause said shoulder portions of the trough to be angularly displaced about the longitudinal axis of the portion of the other frame to bias said frame from engagement with the notch in the latch.

8. The apparatus of claim 7, and further comprising means for retaining the trigger arm on the body member.

9. The apparatus of claim 7, wherein the latch is formed of spaced side walls, the notch being comprised of aligned cut-away portions formed in each of the side walls, the trigger mechanism being surmounted by the latch, the notch in the latch and the recess in the trough of the body member substantially enclosing a portion of the other frame, the wall portions of the other frame received within the recess being spaced from inner walls of said recess, the shoulder portion of the trough adjacent the recess contacting portions of the lower edges of the spaced side walls.

10. The apparatus of claim 9, wherein the latch is formed with a plurality of spaced notches formed in the side walls thereof.

* * * * *